United States Patent
Nemoto (10) Patent No.: US 12,267,323 B2
(45) Date of Patent: Apr. 1, 2025

(54) VEHICLE AUTHENTICATION CONTROL APPARATUS, VEHICLE CONTROL SYSTEM, VEHICLE, AND VEHICLE AUTHENTICATION PROCESSING METHOD TO IMPROVE SECURITY WHILE AVOIDING INCREASE OF IN-VEHICLE COMMUNICATION TRAFFIC

(71) Applicant: HONDA MOTOR CO., LTD., Tokyo (JP)

(72) Inventor: Hirotomi Nemoto, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 17/748,031

(22) Filed: May 19, 2022

(65) Prior Publication Data

US 2022/0385659 A1 Dec. 1, 2022

(30) Foreign Application Priority Data

May 31, 2021 (JP) .................... 2021-090943

(51) Int. Cl.
*H04L 9/40* (2022.01)
*B60R 16/023* (2006.01)
*H04L 12/40* (2006.01)

(52) U.S. Cl.
CPC ...... *H04L 63/0876* (2013.01); *B60R 16/0231* (2013.01); *H04L 12/40* (2013.01);
(Continued)

(58) Field of Classification Search
None
See application file for complete search history.

(56) References Cited

U.S. PATENT DOCUMENTS

| 2016/0297401 A1 | 10/2016 | Haga |
| 2017/0109521 A1 | 4/2017 | Ujiie |

(Continued)

FOREIGN PATENT DOCUMENTS

| CN | 105637803 A | 6/2016 |
| CN | 108306727 A | 7/2018 |

(Continued)

OTHER PUBLICATIONS

Office Action issued for counterpart Chinese Application 202210473497.3, issued by The State Intellectual Property Office of People's Republic of China on Dec. 23, 2024.

*Primary Examiner* — William J. Goodchild (57) ABSTRACT

A vehicle authentication control apparatus comprises an information acquisition unit for acquiring, via an in-vehicle communication network, authenticated information, which is first format information generated by a first authentication method transmitted by at least one vehicle control unit mounted on a vehicle, authentication processing unit for executing authentication processing on the authenticated information, and an information transmitting unit for transmitting, via the in-vehicle communication network to another vehicle control unit, a result of the authentication processing, wherein the in-vehicle communication network has a plurality of vehicle control units physically connected thereto, and authenticated information generated by the first authentication method and second format information generated by a method different from the first authentication method are communicated therethrough, and the first authentication method is for executing authentication processing based on an actual data portion and an authenticator portion included in the authenticated information, and a preset encryption key.

16 Claims, 9 Drawing Sheets

(52) U.S. Cl.
CPC ............ *H04L 2012/40215* (2013.01); *H04L 2012/40273* (2013.01)

(56) References Cited

U.S. PATENT DOCUMENTS

| | | |
|---|---|---|
| 2018/0205729 A1 | 7/2018 | Carlesimo |
| 2018/0212780 A1* | 7/2018 | Talamonti ............ H04L 9/3247 |
| 2018/0337957 A1* | 11/2018 | Chen ..................... H04L 9/3268 |
| 2019/0349394 A1 | 11/2019 | Kishikawa |

FOREIGN PATENT DOCUMENTS

| | | | |
|---|---|---|---|
| CN | 110226310 A | 9/2019 | |
| CN | 111464414 A | 7/2020 | |
| JP | 2020137009 A | 8/2020 | |
| WO | WO-2019145488 A1 * | 8/2019 | ............ G06F 21/57 |

* cited by examiner

VEHICLE AUTHENTICATION CONTROL APPARATUS, VEHICLE CONTROL SYSTEM, VEHICLE, AND VEHICLE AUTHENTICATION PROCESSING METHOD TO IMPROVE SECURITY WHILE AVOIDING INCREASE OF IN-VEHICLE COMMUNICATION TRAFFIC

BACKGROUND

1. Technical Field

The present invention relates to a vehicle authentication control apparatus, a vehicle control system, a vehicle, and a vehicle authentication processing method.

2. Related Art

Patent literature 1 describes a technique in which an ECU executes message authentication on processing target data upon receiving the processing target data via a first network, and when the authentication has failed, receives alternative data from another ECU via a second network.

PRIOR ART LITERATURE

Patent Literature 1: Japanese Patent Application Publication No. 2020-137009

DESCRIPTION OF EXEMPLARY EMBODIMENTS

Hereinafter, the present invention will be described through embodiments of the invention, but the following embodiments do not limit the claimed invention. Further, not all the combinations of features described in the embodiments are essential for means to solve the problem in the invention.

Figure 1:
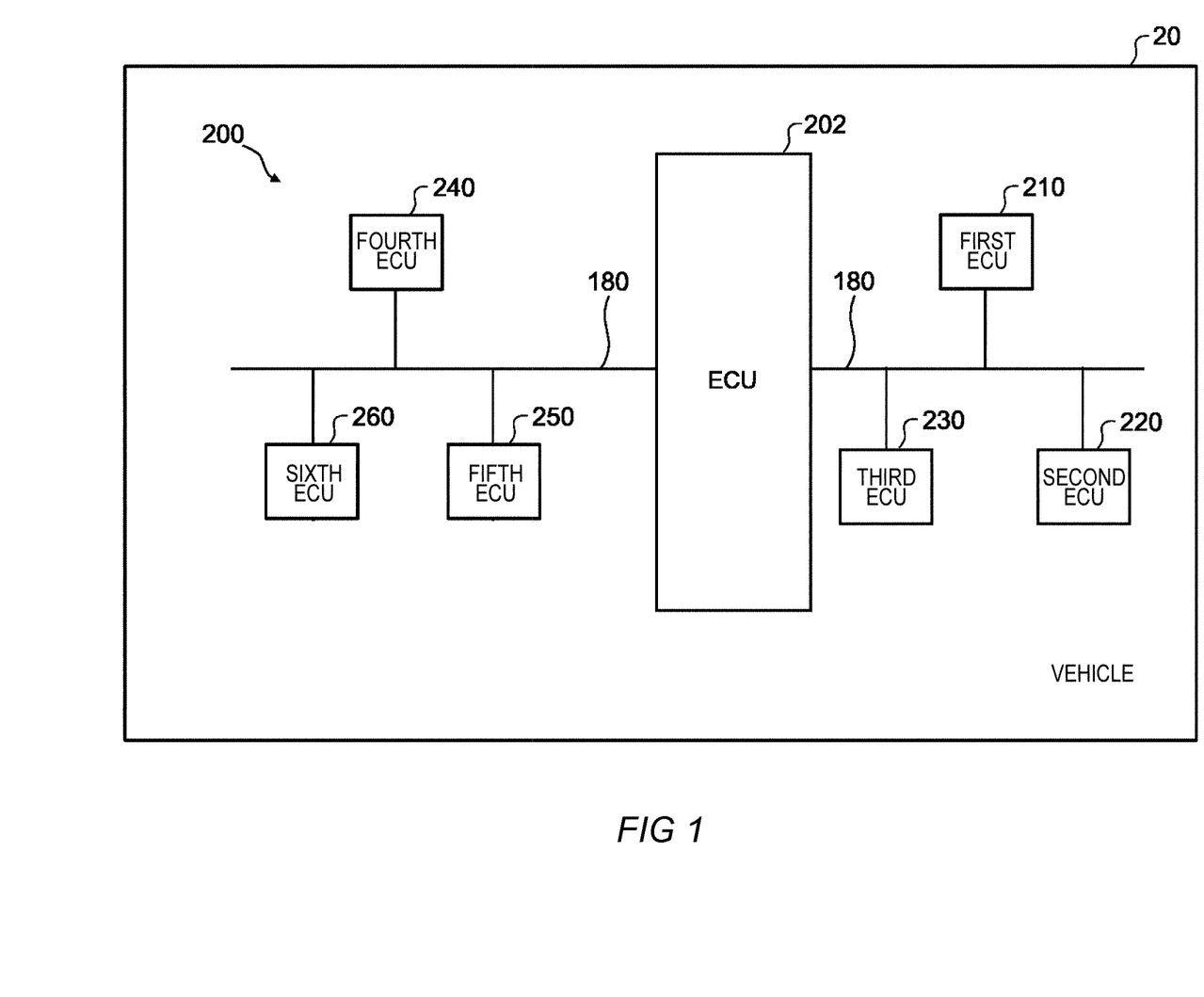
FIG. 1 schematically illustrates a system configuration of a vehicle control system 200.

FIG. 1 schematically illustrates a system configuration of a vehicle control system 200 included in a vehicle 20 according to one embodiment. The vehicle control system 200 includes an ECU 202, a first ECU 210, a second ECU 220, a third ECU 230, a fourth ECU 240, a fifth ECU 250, and a sixth ECU 260, and an in-vehicle communication network 180.

The ECU is an electronic control unit. Each ECU is implemented by including a computing device such as a processor, and a volatile and non-volatile storage media, and operates by operation of the computing device using information stored in the storage media. The ECU directly or indirectly controls the device to be controlled included in the vehicle 20. The device to be controlled is, for example, an engine, a fuel injection apparatus, a motor, a battery and the like.

The in-vehicle communication network 180 is, for example, a CAN (Controller Area Network). The in-vehicle communication network 180 physically connects the ECU 202, the first ECU 210, the second ECU 220, the third ECU 230, the fourth ECU 240, the fifth ECU 250, and the sixth ECU 260. The ECU 202, the first ECU 210, the second ECU 220, the third ECU 230, the fourth ECU 240, the fifth ECU 250, and the sixth ECU 260 are capable of communicating with each other via the in-vehicle communication network 180. The ECU 202 is an ECU that relays communication between the first ECU 210, the second ECU 220 and the third ECU 230, and the fourth ECU 240, the fifth ECU 250 and the sixth ECU 260. Note that, the in-vehicle communication network 180 is not limited to the CAN, and may be any communication network for a vehicle such as a LIN.

Note that, although, in the present embodiment, a system configuration in which the vehicle control system 200 includes the ECU 202, the first ECU 210, the second ECU 220, the third ECU 230, the fourth ECU 240, the fifth ECU 250, and the sixth ECU 260, and the in-vehicle communication network 180 is illustrated, the system configuration of the vehicle control system 200 is not limited to the example of the present embodiment.

Figure 2:
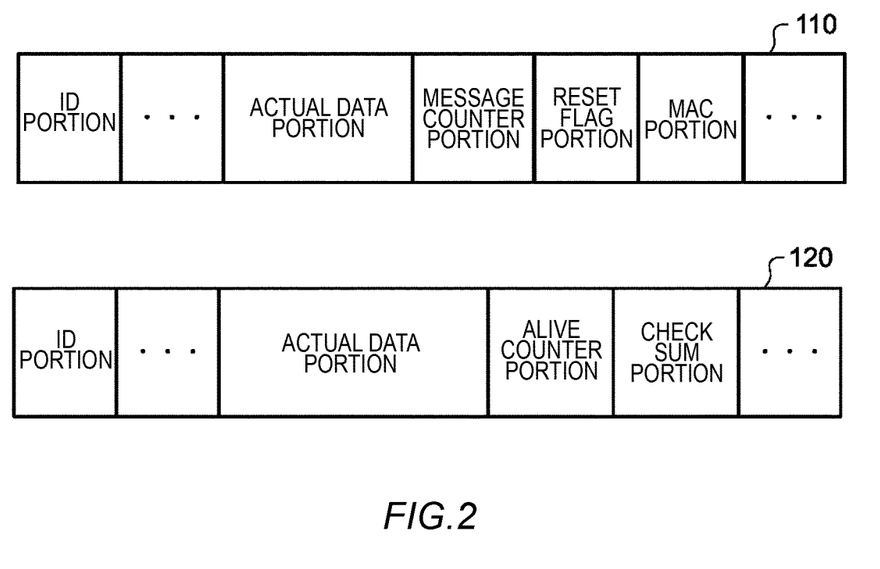
FIG. 2 illustrates a format of two types of information that is transmitted via an in-vehicle communication network 180.

FIG. 2 illustrates a format of two types of information that is transmitted via the in-vehicle communication network 180. The first format 110 is a format of information with MAC that is the first format information generated by the ECU with a first authentication method. The information with MAC is an example of authenticated information. The second format 120 is a format of the second format information generated by the ECU with a method that is different from the first authentication method. Here, authenticating includes evaluating the reliability of an actual data portion. The first format information and the second format information are both communicated to through the in-vehicle communication network 180.

The information with MAC transmitted by the first format 110 includes an ID portion, an actual data portion, a message counter portion, a reset flag portion, and a message authentication code (MAC) portion. The ID portion has stored therein, for example, CAN-ID. The actual data portion has stored therein data to be transmitted to another ECU. The actual data portion has stored therein a measurement value of the road speed or the like, for example The message counter portion has stored therein a value that is different for each transmission as a countermeasure for retransmission attack. The value to be stored in the message counter portion may be, for example, a sequence number, a time stamp, a session number, and the like. The reset flag portion has stored herein a value indicating a reset state of the message counter. The MAC portion has stored therein a message authentication code generated using an encryption key. As an example, the message authentication code is data generated from information in the actual data portion, information in the message counter portion, and information in the reset flag by using the encryption key. The encryption key may be a common key that is common among the ECUs connected to the vehicle control system 200. In this manner, the ECU having received the information with MAC can perform authentication processing on the information with MAC by verifying whether the information in the MAC portion is correct or not by using the received information with MAC and the common key. Note that, the MAC portion is an example of an authenticator portion.

The information transmitted in the second format 120 includes an ID portion, an actual data portion, an alive counter portion, and a check sum portion. The second format 120 does not include a message authentication code. The alive counter portion has stored therein a value to be incremented for each transmission. The check sum portion has stored therein information for error detection. The check sum portion has stored therein a sign value that is calculated from a predetermined portion of the information transmitted in the second format 120. The check sum is an example of information generated by using only the data included in the information transmitted in the second format 120. As an example, the check sum may be a sign value of CRC or the like. For the information that is transmitted and received in the second format 120, evaluation of reliability or authentication of the actual data portion may be executed by comparing the values in the alive counter portion or the check sum portion with a value in the actual data portion.

Note that, the first format 110 and the second format 120 also include information other than the information described above, but description thereof will be omitted since it is not used in the authentication processing at the vehicle control system 200.

The information with MAC has authentication information calculated by using the encryption key. Therefore, by exchanging information using the information with MAC, security against spoofing attack of the transmission source can be improved as compared to a case in which information in the second format 120 is exchanged.

Figure 3:
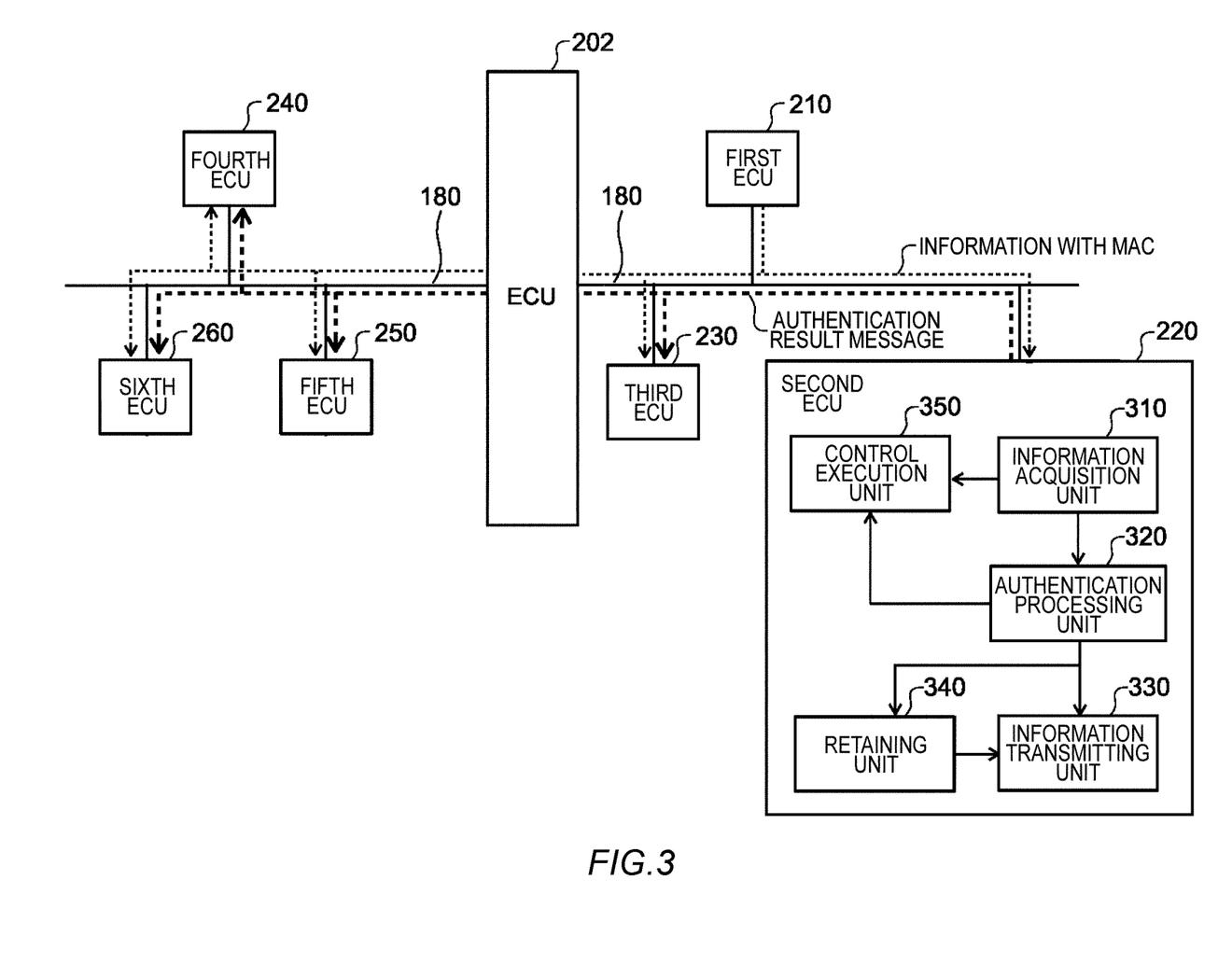
FIG. 3 is a figure for describing the flow of authentication processing at the vehicle control system 200.

FIG. 3 is a figure for describing the flow of authentication processing at the vehicle control system 200.

In the vehicle control system 200, the first ECU 210, the second ECU 220, the fourth ECU 240, and the fifth ECU 250 are ECUs that are capable of processing the information with MAC generated by the first authentication method. Specifically, the first ECU 210, the second ECU 220, the fourth ECU 240, and the fifth ECU 250 are ECUs that are capable of reading the information with MAC for which an authenticator portion is generated by the first authentication method. The third ECU 230 and the fourth ECU 240 are ECUs that are capable of reading the second format information but are not capable of processing the information with MAC authenticated by the first authentication method. Specifically, the third ECU 230 and the fourth ECU 240 are ECUs that are not capable of reading the information with MAC. Note that, the third ECU 230 and the fourth ECU 240 is capable of reading the actual data portion of the information with MAC. The first ECU 210, the second ECU 220, and the third ECU 230 are an example of the first vehicle control unit, the second vehicle control unit, and the third vehicle control unit, respectively. In particular, the second ECU 220 is an example of a vehicle control unit that functions as a vehicle authentication control apparatus.

In the vehicle control system 200, when the first ECU 210 transmits the information with MAC via the in-vehicle communication network 180, the second ECU 220, the third ECU 230, the fourth ECU 240, the fifth ECU 250, and the sixth ECU 260 receives the information with MAC. The second ECU 220, the fourth ECU 240, and the fifth ECU 250 respectively performs authentication processing on the information with MAC, and based on the result of the authentication processing, performs control of the vehicle 20 based on information in the actual data portion included in the information with MAC.

Having performed the authentication processing on the information with MAC, the second ECU 220 transmits, via the in-vehicle communication network 180, an authentication result message including a result of the authentication processing on the information with MAC. Upon receiving the result of the authentication processing on the information with MAC transmitted to the in-vehicle communication network 180 by the second ECU 220, the third ECU 230 and the sixth ECU 260 perform control of the vehicle 20 based on the information with MAC received via the in-vehicle communication network 180 if the result of the authentication processing is normal, and does not perform control of the vehicle 20 based on the information with MAC received via the in-vehicle communication network 180 if the result of the authentication processing is abnormal.

In this manner, it is possible to construct the in-vehicle communication network 180 having a mix of ECUs that are capable of processing the information with MAC and ECUs that are not capable of processing the information with MAC, to enable use of the authentication result by MAC even in ECUs that are not capable of processing the information with MAC. Here, not being capable of processing the information with MAC includes not being capable of performing authentication processing of the actual data portion included in the information with MAC. That is, it includes not being capable of performing determination of whether information in the actual data portion included in the information with MAC exchanged over the vehicle communication network is reliable. For example, the even if it is information with MAC, the actual data portion is exchanged in a form that can be read by the third ECU. Therefore, it is possible to exchange data by the information with MAC without all the ECUs connected to the in-vehicle communication network 180 being ECUs that are capable of processing the information with MAC, which enables the security to be improved without requiring a large change in its design.

The operation of each ECU by the vehicle control system 200 will be described in detail. The first ECU 210 transmits, via the in-vehicle communication network 180, information with MAC authenticated by the first authentication method. The first authentication method is an authentication method of executing the authentication processing based on an actual data portion and an authenticator portion included in the information with MAC, and a preset encryption key. The second ECU 220 receives, via the in-vehicle communication network 180, the information with MAC, and transmits, via the in-vehicle communication network 180, a result of the authentication processing on the information with MAC. The third ECU 230 receives, via the in-vehicle communication network 180, the information with MAC transmitted from the first ECU 210 and the result of the authentication processing transmitted from the second ECU 220. The third ECU 230 controls the vehicle by using data included in the information with MAC received from the first ECU 210, based on the result of the authentication processing by the second ECU 220.

The second format information includes information generated by using only data included in the second format information. The check sum described above is an example of information generated by using only data included in the second format information. In a case where the second format information is received via the in-vehicle communication network 180, the third ECU 230 executes the authentication processing by using only the data included in the second format information.

The second ECU 220 transmits the result authentication processing with a first transmission cycle, which is a cycle for transmitting a result of the authentication processing, being longer than a second transmission cycle of the first ECU 210 transmitting the information with MAC. The third ECU 230 retains the result of the authentication processing transmitted from the second ECU 220. In a case where a new piece of information with MAC is received from the first ECU 210, the third ECU 230 executes vehicle control by using information in the actual data portion included in the new piece of information with MAC, based on the result of the authentication processing that is retained. For example, in a case where the information in the actual data portion is vehicle velocity information, the third ECU 230 may control, based on the vehicle velocity information, display of a meter or the like included in the vehicle 20.

The information acquisition unit 310 is connected to the first ECU 210, the second ECU 220, the third ECU 230, the fourth ECU 240, the fifth ECU 250, and the sixth ECU 260 via the in-vehicle communication network. The information acquisition unit 310 acquires, via the in-vehicle communication network 180, the information with MAC that is first format information generated by the first authentication method transmitted by at least one ECU mounted on the vehicle 20. The first authentication method is an authentication method for executing authentication processing based on an actual data portion and an authenticator portion included in the information with MAC, and an encryption key that is set in advance. The in-vehicle communication network 180 is a network that has a plurality of ECUs physically connected thereto, and through which the authenticated information generated by the first authentication method and the second format information generated by a method that is different from the first authentication method communicate.

The authentication processing unit 320 executes authentication processing on the information with MAC. The authentication processing unit 320 performs the authentication processing corresponding to the first authentication method. The information transmitting unit 330 transmits the result of the authentication processing executed by the authentication processing unit 320 to another ECU via the in-vehicle communication network 180. For example, the information transmitting unit 330 transmits the result of the authentication processing in the form of the second format 120 to another ECU via the in-vehicle communication network 180. At this time, the information transmitting unit 330 transmits the result authentication processing, with the CANID of the information with MAC subjected to the authentication processing, and information indicating whether the result of the authentication processing is "normal" or "abnormal" included in the actual data portion in the second format 120. In this manner, the third ECU 230 and the sixth ECU 260 that are not capable of processing the information with MAC can determine which information with MAC having which CANID is normal or abnormal.

The retaining unit 340 retains the result of the authentication processing. In a case where the result of the authentication processing on the new piece of information with MAC acquired by the information acquisition unit 310 is different from the result retained in the retaining unit 340, the information transmitting unit 330 transmits the result of the authentication processing on the new piece of information with MAC.

The information transmitting unit 330 transmits the result of the authentication processing with the first transmission cycle, which is a cycle for transmitting the result of the authentication processing, being longer than a second transmission cycle for transmitting the authenticated information. Note that, in a case where the result of the authentication processing on the new piece of information with MAC acquired by the information acquisition unit 310 is different from the result that is retained in the retaining unit 340, in addition to transmitting the result of the authentication processing in a first transmission cycle, the information transmitting unit 330 transmits the result of the authentication processing on the new piece of information with MAC.

The retaining unit 340 retains the result of the authentication processing for each ECU from which the information with MAC is transmitted. The information transmitting unit 330 determines, for each ECU from which the information with MAC is transmitted, whether the result of the authentication processing on the new piece of information with MAC is different from the result that is retained in the retaining unit 340, and determines, for each ECU from which the information with MAC is transmitted, whether to transmit the result of the authentication processing on the new piece of information with MAC. For example, the retaining unit 340 retains the result of the authentication processing in association with the identification information of the ECU from which the information with MAC is transmitted. The information transmitting unit 330 acquires the result of the authentication processing that is retained in the retaining unit 340 in association with the identification information of the ECU from which the new piece of information with MAC is transmitted. in a case where the result of the authentication processing that is retained in association with the identification information of the ECU from which the new piece of information with MAC is transmitted is different from the result of the authentication processing on the new piece of information with MAC, the information transmitting unit 330 transmits the result of the authentication processing on the new piece of information with MAC. Note that, the ECU that is the transmission source may be identified based on information in the ID portion of the information with MAC, and information associating the ECU that is the transmission source with the information in the ID portion.

The control execution unit 350 executes vehicle control by using the information in the actual data portion based on the result of the authentication processing. For example, in a case where the information in the actual data portion is road speed information, the control execution unit 350 may execute control of a motor or the like included in the vehicle 20, based on the vehicle velocity information.

In a case where information authenticated by a second authentication method which uses only data included in the received information is received via the in-vehicle communication network 180, the authentication processing unit 320 may execute the authentication processing by using only data included in the information authenticated by the second authentication method. For example, in a case where the information transmitted from the third ECU 230 or the sixth ECU 260 is received via the in-vehicle communication network 180, the authentication processing unit 320 may execute the authentication processing by using a value in the check sum portion and a value in the alive counter portion. For example, the authentication processing unit 320 may calculate a value of the check sum in a predetermine portion of the received information, and authenticate the received information as normal in a case where the calculated value of the check sum and the value in the check sum portion of the received information coincide with each other. In addition, in a case where the value of the alive counter portion in the received information is a value that is incremented from a value of the alive counter portion in the last received information, the authentication processing unit 320 may authenticate the received information as being normal.

Figure 4A:
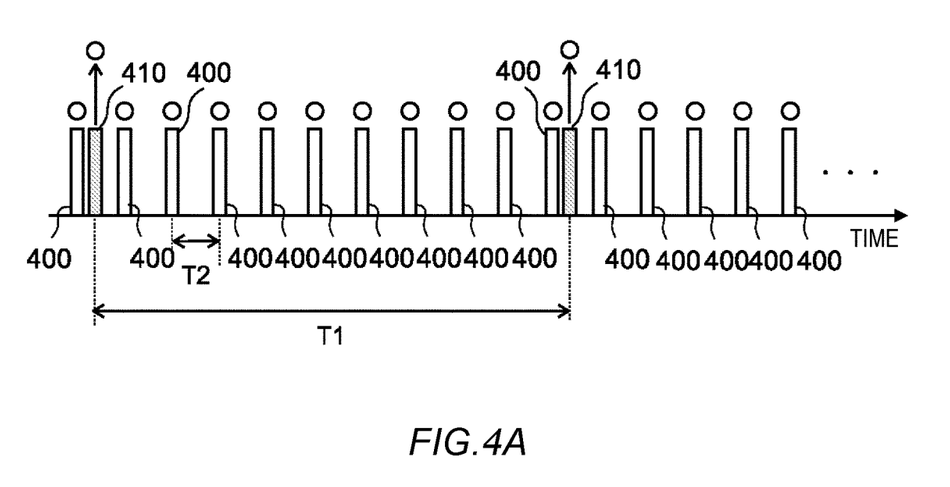
FIG. 4A schematically illustrates sending timing of information with MAC and an authentication result message on the in-vehicle communication network 180.
Figure 4B:
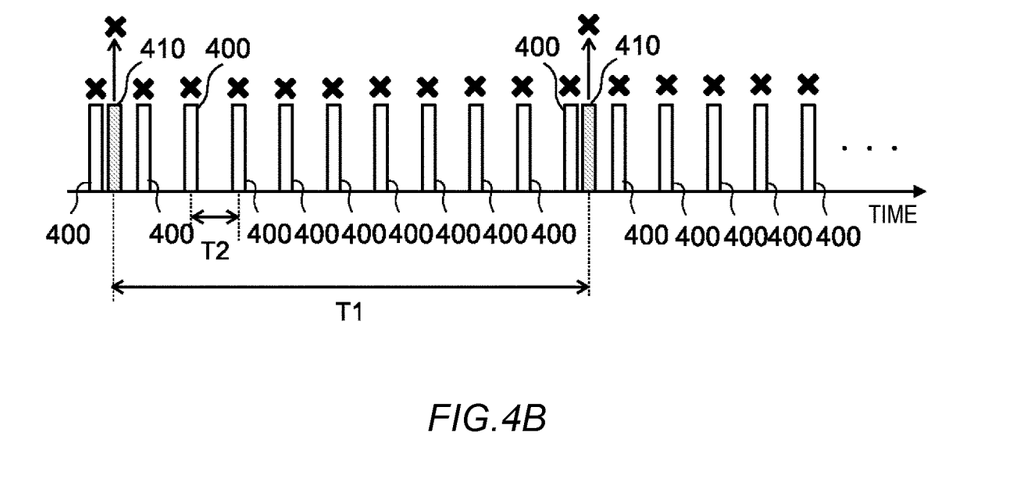
FIG. 4B schematically illustrates sending timing of information with MAC and an authentication result message on the in-vehicle communication network 180.

FIG. 4 schematically illustrates sending timing of information with MAC and an authentication result message on the in-vehicle communication network 180.

The first ECU 210 transmits a plurality of information with MAC 400 at a predetermined cycle T2 via the in-vehicle communication network 180. As an example, the first ECU 210 transmits the information with MAC 400 at a cycle of 10 ms via the in-vehicle communication network 180. The information with MAC 400 includes, in the actual data portion, vehicle velocity information measured at different timing, for example.

Note that, "O" shown in association with the information with MAC in FIG. 4A indicates that the corresponding information with MAC is a normally authenticated information with MAC. That is, it is indicated that the information with MAC 400 having "O" associated therewith includes the MAC generated by using a correct encryption key. Note that, although "O" is illustrated in FIG. 4A, "X" indicating that MAC could not be authenticated may be transmitted at a certain cycle, instead of "O", as shown in FIG. 4B.

At the second ECU 220, the authentication processing unit 320 performs the authentication processing each time the information with MAC 400 is received. Each time the information with MAC 400 is received, the authentication processing unit 320 calculates information corresponding to the MAC by using an encryption key from the data included in the received information with MAC 400, and in a case where the information calculated by using the encryption key coincides with information of the MAC portion included in the received information with MAC 400, determines that the information with MAC 400 is normal. The authentication processing unit 320 causes the retaining unit 340 to retain the result of the authentication processing each time the information with MAC 400 is received.

The information transmitting unit 330 transmits, via the in-vehicle communication network 180, an authentication result message 410 indicating the result of the authentication processing on the information with MAC 400. In FIG. 4, an authentication result message 410 with which "O" is associated indicates that information indicating that the result of the authentication processing is normal is included. Note that, the information transmitting unit 330 transmits the authentication result message 410 at a cycle T1. T1 is 100 ms, for example The information transmitting unit 330 transmits the authentication result message 410 in a case where 100 ms has elapsed since the timing at which the authentication result message 410 was last transmitted.

Figure 5:
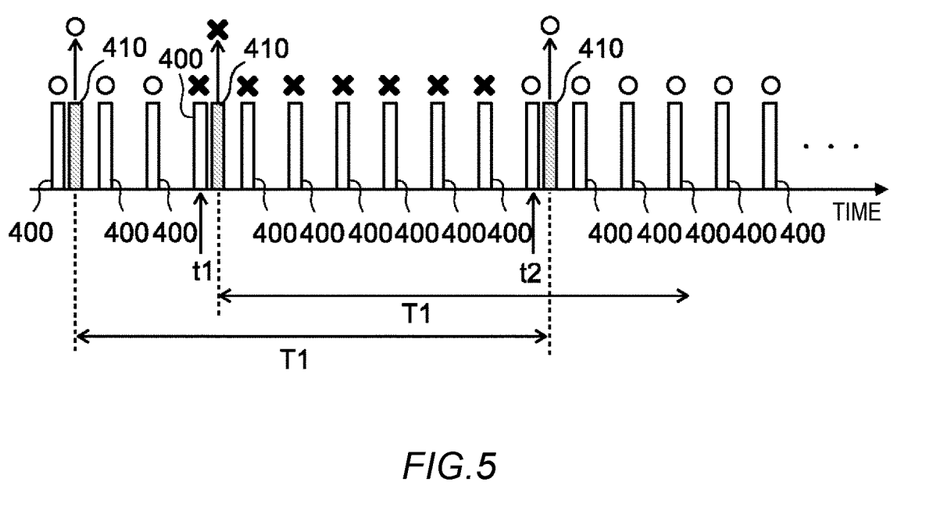
FIG. 5 schematically illustrates sending timing of information with MAC and an authentication result message on the in-vehicle communication network 180.

FIG. 5 schematically illustrates sending timing of information with MAC and an authentication result message on the in-vehicle communication network 180. FIG. 5 illustrates sending timing in a case where abnormal information with MAC is sent to the in-vehicle communication network 180.

Note that, "O" shown in association with the information with MAC in FIG. 5 indicates that the corresponding information with MAC is a normally authenticated information with MAC. In FIG. 5, "X" shown in association with the information with MAC indicates that the corresponding information with MAC does not include a MAC generated by using a correct encryption key.

At the second ECU 220, each time the information with MAC 400 is received, the authentication processing unit 320 calculates information corresponding to the MAC by using an encryption key from the information included in the received information with MAC 400. When abnormal information with MAC 400 is transmitted at time T1, the information calculated by using an encryption key from the received information with MAC 400 does not coincided with information in the MAC portion included in the received information with MAC 400. Therefore, the authentication processing unit 320 determines that the received information with MAC 400 is abnormal information with MAC. In a case where it Is determined by the authentication processing unit 320 that the information with MAC is abnormal, since the authentication result that is currently retained in the retaining unit 340 is "normal", the information transmitting unit 330 transmits, via the in-vehicle communication network 180, an authentication result message 410 indicating "abnormal" as the result of the authentication processing on the received information with MAC 400. Note that, in FIG. 4, an authentication result message 410 with which "X" is associated indicates that information indicating that the result of the authentication processing is abnormal is included.

After time T1, in a case where the information calculated by using the encryption key does not coincide with the information in the MAC portion included in the received information with MAC 400, the information transmitting unit 330 does not transmit the authentication result message 410 if the authentication result that is retained in the retaining unit 340 is "abnormal". When normal information with MAC 400 is transmitted at time T2, the information calculated using the encryption key by the authentication processing unit 320 coincides with the information in the MAC portion included in the received information with MAC 400. On the other hand, since the authentication result that is retained in the retaining unit 340 is "abnormal", the information transmitting unit 330 transmits an authentication result message 410 including information indicating that the result of the authentication processing is normal.

In this manner, even without elapse of the cycle T1 since the timing at which the authentication result message 410 was last transmitted, in a case where the result of the authentication processing on the new piece of information with MAC is different from the authentication result that is retained in the retaining unit 340, the information transmitting unit 330 transmits the authentication result message 410. In this case, the cycle T1 for transmitting the authentication result message 410 may begin from the timing at which the new piece of authentication result message 410 is transmitted. In addition, in a case where the cycle T1 has elapsed since the timing at which the authentication result message 410 was last transmitted, even if the result of the authentication processing on the new piece of information with MAC coincides with the authentication result that is retained in the retaining unit 340, the information transmitting unit 330 transmits the authentication result message 410. In this manner, increase in traffic over the in-vehicle communication network 180 can be suppressed, as compared to a case in which the result of the authentication processing on all of the information with MAC 400 is transmitted through the in-vehicle communication network 180.

Figure 6:
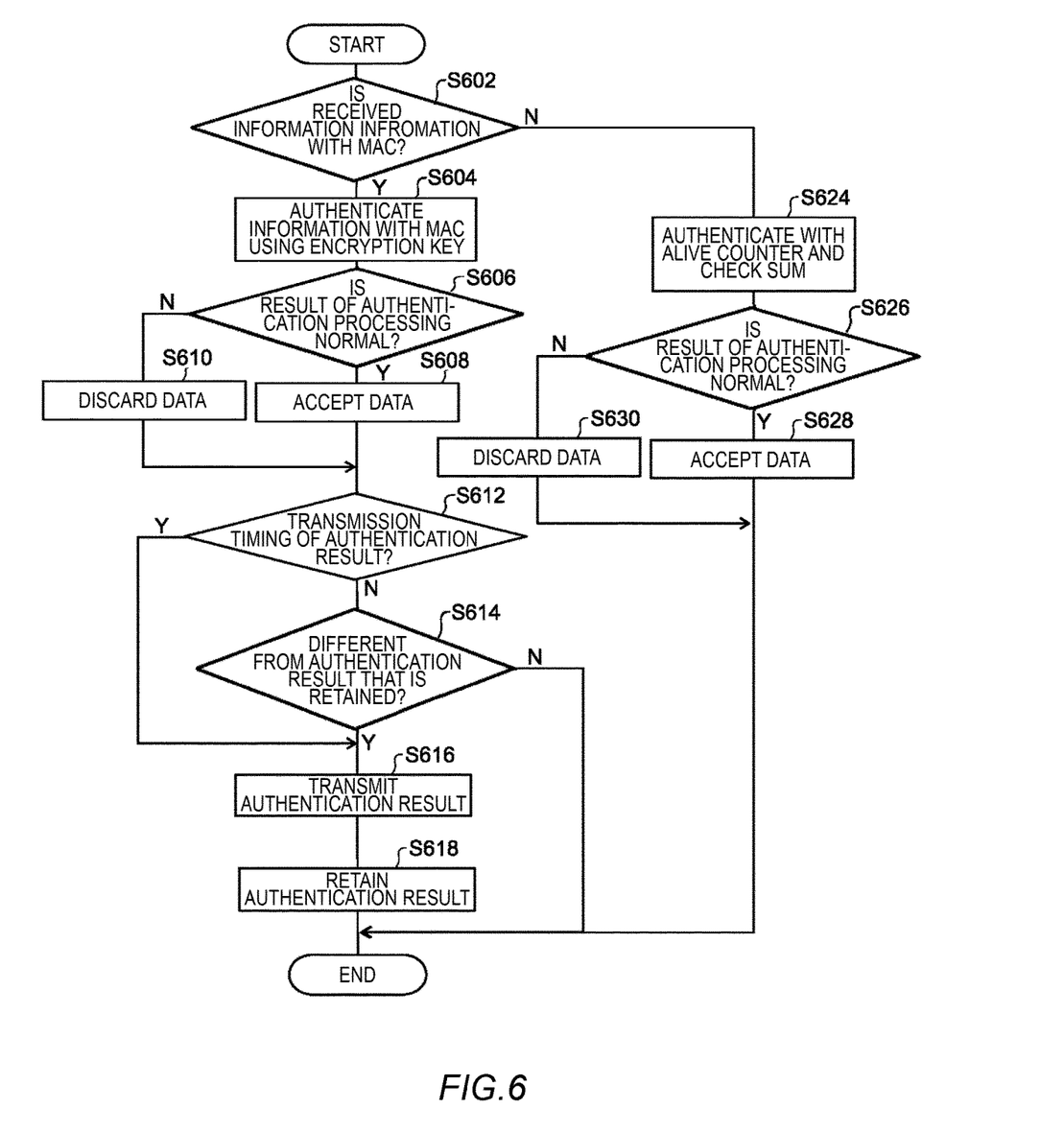
FIG. 6 illustrates an example of a flowchart illustrating a procedure according to authentication processing executed by a second ECU 220.

FIG. 6 illustrates an example of a flowchart illustrating a procedure according to authentication processing executed by a second ECU 220. The processing of this flowchart starts when the second ECU 220 receives information through the in-vehicle communication network 180.

At S602, the authentication processing unit 320 determines whether the received information is information with MAC. In a case where the received information is information with MAC, at S604, the received information with MAC is authenticated by using an encryption key. Specifically, the authentication processing unit 320 calculates information corresponding to the MAC by using the encryption key from the information included in the received information with MAC, and acquires an authentication result on whether the calculated information coincides with the information in the MAC portion included in the receive information with MAC. At S606, the authentication processing unit 320 determines whether the authentication result is normal. In a case where the authentication result is normal, the data included in the actual data portion of the information with MAC is accepted, and the control execution unit 350 executes a processing related to control of the vehicle 20 based on the data included in the actual data portion of the information with MAC (S608). On the other hand, in a case where the authentication result at S604 is abnormal, the information with MAC is discarded (S610).

Following S608 and S610, the information transmitting unit 330 determines whether it is the transmission timing of the authentication result (S612). Specifically, in a case where the cycle T1 has elapsed after the authentication result message was last transmitted, the information transmitting unit 330 determines that it is the transmission timing of the authentication result, and in a case where the cycle T1 has not elapsed since the authentication result message is last transmitted, the information transmitting unit 330 determines that it is not the transmission timing of the authentication result. In a case where it is determined that it is not the transmission timing of the authentication result, the processing proceeds to S616. In a case where it is determined that it is the transmission timing of the authentication result, the information transmitting unit 330 determines whether the authentication result at S604 is different from the authentication result that is retained in the retaining unit 340 at S614. Note that, the information transmitting unit 330 performs determination of S614 for each transmission source of the received information with MAC That is, the information transmitting unit 330 determines whether the authentication result at S604 is different from the authentication result associated with the identification information from the same transmission source in the retaining unit 340.

At S614, in a case where it is determined that the authentication result at S604 coincides with the authentication result that is retained in the retaining unit 340, the processing of this flowchart ends. In a case where the authentication result at S604 is different from the authentication result that is retained in the retaining unit 340, an authentication result message 410 including the authentication result is transmitted at S616. Then, at S618, the retaining unit 340 retains the authentication result at S604.

At S602, in a case where it is determined that the received information is not information with MAC, at S624, the authentication is performed by using a value of the alive counter and a check sum included in the received information. At S626, the authentication processing unit 320 determines whether the authentication result at S624 is normal. In a case where the authentication result is normal, data included in the actual data portion of the received information is accepted (S628), and the control execution unit 350 executes processing related to control of the vehicle 20 based on the data included in the actual data portion. On the other hand, in a case where the authentication result at S624 is abnormal, the received information is discarded (S630).

Figure 7:
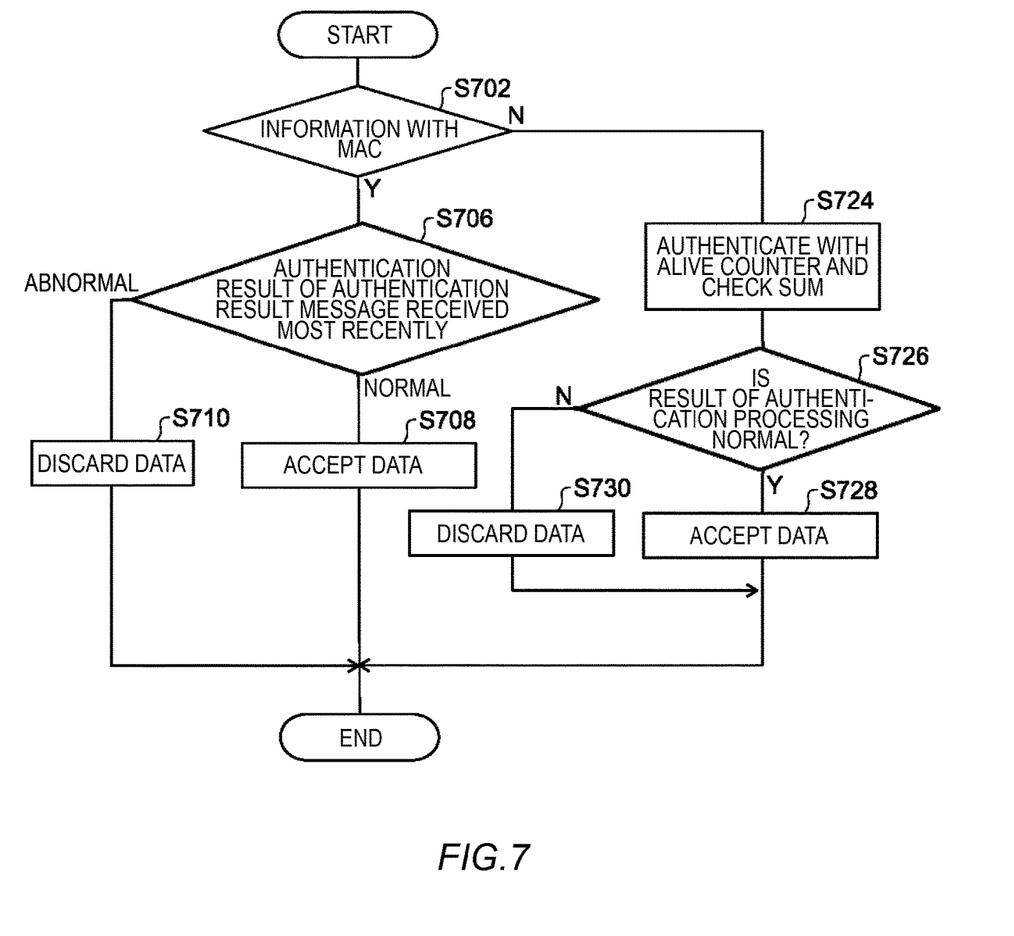
FIG. 7 illustrates an example of a flowchart illustrating a procedure according to authentication processing executed by a third ECU 230.

FIG. 7 illustrates an example of a flowchart illustrating a procedure according to authentication processing executed by a third ECU 230. The processing of this flowchart starts when the third ECU 230 receives information through the in-vehicle communication network 180.

At S702, the third ECU 230 determines whether the received information is information with MAC. In a case where the received information is information with MAC, at S706, the third ECU 230 determines whether the authentication result included in the authentication result message 410 received most recently is information indicating "normal" or information indicating "abnormal". In a case where the authentication result included in the authentication result message 410 received most recently is "normal", the third ECU 230 accepts data included in the actual data portion of the information with MAC, and executes processing related to control of the vehicle 20 based on the data included in the actual data portion of the information with MAC (S708). On the other hand, in a case where the authentication result included in the authentication result message 410 received most recently is "abnormal", the third ECU 230 discards the information with MAC (S710). Following the processing of S708 and S708, the processing of this flowchart ends.

At S702, in a case where it is determined that the received information is not information with MAC, at S724, the third ECU 230 performs authentication by using a value of the alive counter and a check sum included in the received information. At S626, the authentication processing unit 320 determines whether the authentication result at S724 is normal. In a case where the authentication result is normal, the third ECU 230 accepts the data included in the actual data portion of the received information is accepted (S728), and executes processing related to control of the vehicle 20 based on the data included in the actual data portion. On the other hand, in a case where the authentication result at S724 is abnormal, the received information is discarded (S730). Following the processing of S708 and S708, the processing of this flowchart ends.

As described above, with the vehicle control system 200 according to the present embodiment, it is possible to construct the in-vehicle communication network 180 having a mix of ECUs that are capable of processing the information with MAC and ECUs that are not capable of processing the information with MAC, to enable use of the authentication result by MAC even in ECUs that are not capable of processing the information with MAC. Therefore, it is possible to exchange data by the information with MAC without all the ECUs connected to the in-vehicle communication network 180 being ECUs that are capable of processing the information with MAC. Therefore, since the security can be improved without requiring a large change in its design, the cost can be reduced.

In addition, with the vehicle control system 200 according to the present embodiment, the second ECU 220 performs transmission with the transmission cycle T1 of the authentication result message being longer than the transmission cycle T2 of the information with MAC, without transmitting the authentication data acquired from the information with MAC. In this manner, increase in traffic over the in-vehicle communication network 180 can be suppressed. In addition, it is not necessary to provide a second network for receiving alternative data from another ECU, such as required for the technique described in the prior art documents described above.

Note that the vehicle 20 is a vehicle as an example of transportation equipment. The vehicle may be an automobile such as an automobile comprising an internal combustion engine, an electric vehicle, and a fuel cell vehicle (FCV). The automobile includes a bus, a truck, a motorcycle or the like. The vehicle may be a saddle type vehicle or the like, and may be a motorcycle. The transportation equipment includes, in addition to the vehicle, equipment such as an aircraft including an unmanned aerial vehicle, and a ship. The transportation equipment may be any equipment that transports people or goods. The transportation equipment is an example of the moving object. The moving object is not limited to the transportation equipment, and may be any movable equipment.

Figure 8:
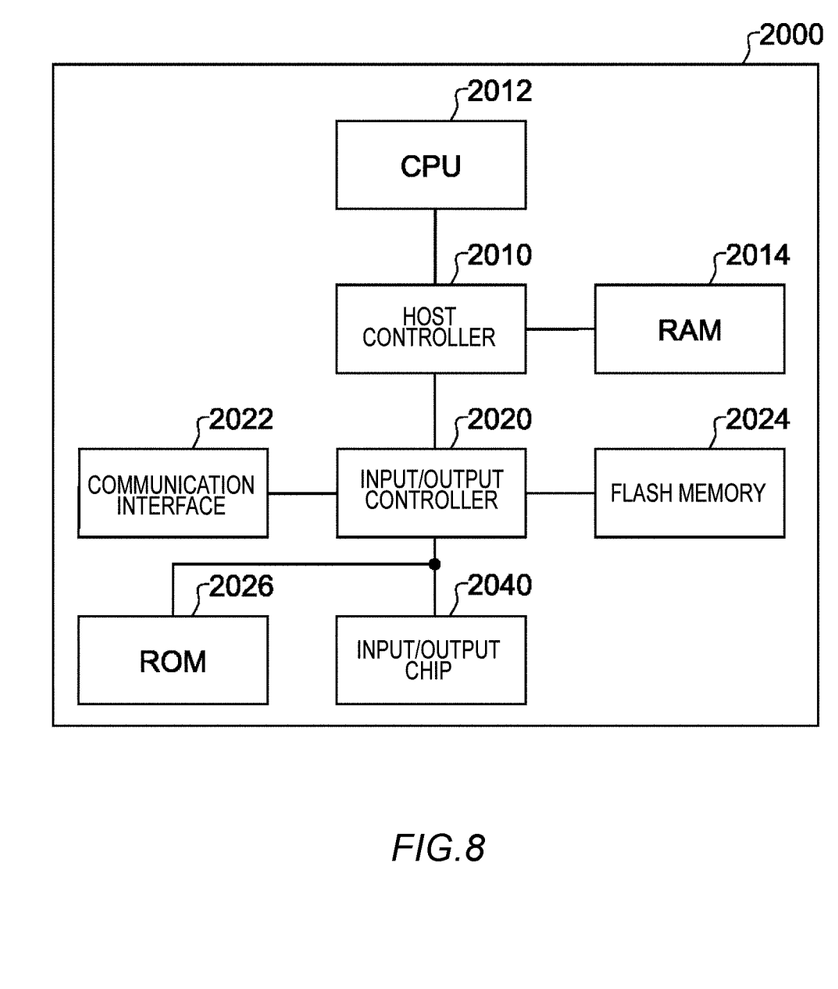
FIG. 8 illustrates an example of a computer 2000.

FIG. 8 illustrates an example of a computer 2000 where a plurality of embodiments of the present invention may be entirely or partially embodied. The program installed on the computer 2000 can cause the computer 2000 to serve as a system such as the communication system according to the embodiment, a communication apparatus or each unit of the apparatus, perform an operation associated with the apparatus or each unit of the apparatus, and/or perform a process according to the embodiment or steps of the process. Such a program may be executed by a CPU 2012 in order to cause the computer 2000 to execute a specific operation associated with some or all of the blocks in the processing procedure and the block diagram described in the specification.

The computer 2000 according to this embodiment includes the CPU 2012 and RAM 2014, which are connected mutually by a host controller 2010. The computer 2000 also includes a ROM 2026, a flash memory 2024, a communication interface 2022, and an input/output chip 2040. The ROM 2026, the flash memory 2024, the communication interface 2022 and the input/output chip 2040 are connected to the host controller 2010 via an input/output controller 2020.

The CPU 2012 operates according to the program stored in the ROM 2026 and the RAM 2014, thereby controlling each unit.

The communication interface 2022 communicates with other electronic devices via a network. The flash memory 2024 stores the program and data used by the CPU 2012 in the computer 2000. The ROM 2026 stores a boot program or the like executed by the computer 2000 during activation, and/or a program depending on hardware of the computer 2000. The input/output chip 2040 may also connect, to the input/output controller 2020, a variety of input/output unit such as a keyboard, a mouse, and a monitor, via input/output ports such as a serial port, a parallel port, a keyboard port, a mouse port, a monitor port, a USB port, and HDMI (registered trademark) port.

The program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing described in the program is read by the computer 2000, thereby resulting in cooperation between the program and above-described various types of hardware resources. An apparatus or method may be constituted by implementing the operations or processing on information according to the use of the computer 2000.

For example, when communications are performed between the computer 2000 and external devices, the CPU 2012 may execute a communication program loaded in the RAM 2014, and instruct the communication interface 2022 to execute communication processing on based on the processes written in the communication program. The communication interface 2022, under the control of the CPU 2012, reads out transmission data stored in a transmission buffer processing area provided in a recording medium such as the RAM 2014 and the flash memory 2024, transmits the read transmission data to the network, and writes a reception data received from the network into a reception buffer processing area or the like provided on the recording medium.

Also, the CPU 2012 may cause all or required portions of a file or a database stored in the recording medium such as the flash memory 2024 to be read by the RAM 2014, and perform various kinds of processes on the data on the RAM 2014. The CPU 2012, then, writes back the processed data into the recording medium.

Various types of programs and various types of information such as data, tables, and databases may be stored in the recording medium, and they may be performed information processing. The CPU 2012 may perform, on the data read from the RAM 2014, various kinds of processing including various kinds of operations, information processing, conditional judgments, conditional branching, unconditional branching, information searching/replacing and the like described in the specification and specified by an instruction sequence of the program, and writes back the result into the RAM 2014. Also, the CPU 2012 may search for information in a file, a database, etc., in the recording medium. For example, when a plurality of entries each having an attribute value of a first attribute respectively associated with an attribute value of a second attribute is stored in the recording medium, the CPU 2012 may search for, from among the plurality of entries, an entry in which the attribute value of the first attribute is specified and that match with a condition, read the attribute value of the second attribute stored in the entry, and thereby obtain the attribute value of the second attribute associated with the first attribute meeting a predetermined condition.

The program or software module described above may be stored on the computer 2000 or in a computer-readable storage medium near the computer 2000. The recording medium such as a hard disk or RAM provided in a server system connected to a dedicated communication network or the internet is available as a computer-readable storage medium. The program stored in the computer-readable storage medium may be provided to the computer 2000 via the network.

The program installed in the computer 2000 and causing the computer 2000 to function as the second ECU 220 may instruct the CPU 2012 or the like to cause the computer 2000 to function as each unit of the second ECU 220. The information processing written in these programs are read by the computer 2000 to cause the computer to function as each unit of the second ECU 220, which is a specific means realized by the cooperation of software and the various types of hardware resources described above. Then, these specific means implement operations or processing of information according to the intended use of the computer 2000 in this embodiment, so that a unique ECU is constructed according to the intended use.

A variety of embodiments have been described with reference to the block diagram and the like. In the block diagram, each block may represent (1) a step of a process in which an operation is performed, or (2) each unit of the apparatus having a role of performing the operation. Specific steps and each unit may be implemented by a dedicated circuit, a programmable circuit provided along with a computer-readable instruction stored on a computer-readable storage medium, and/or a processor provided along with the computer-readable instruction stored on the computer-readable storage medium. The dedicated circuit may include a digital and/or analog hardware circuit, or may include an integrated circuit (IC) and/or a discrete circuit. The programmable circuit may include a reconfigurable hardware circuit including: logical AND, logical OR, exclusive OR (XOR), negative AND (NAND), negative OR (NOR), and other logical operation; and a memory element such as a flip-flop, a register, a field programmable gate array (FPGA), a programmable logic array (PLA); and so on.

The computer-readable storage medium may include any tangible device capable of storing an instruction executed by an appropriate device, so that the computer-readable medium having the instruction stored thereon constitutes at least a part of a product including the instruction that may be executed in order to result in a means for executing an operation specified by a processing procedure or a block diagram. Examples of computer-readable storage media may include an electronic storage medium, a magnetic storage medium, an optical storage medium, an electromagnetic storage medium, a semiconductor storage medium, etc. More specific examples of computer-readable storage media may include a floppy disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk (registered trademark), JAVA (registered trademark), C++, etc., and conventional procedural programming languages, such as the "C" programming language or similar programming languages.

Computer-readable instructions may be provided to a general-purpose computer, a special-purpose computer, or a processor or a programmable circuit of other programmable data processing apparatus, locally or via a local area network (LAN), a wide area network (WAN) such as the internet, and computer-readable instructions may be executed in order to result in a means for executing operations specified by the described processing procedure or the block diagram. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: vehicle,
110: first format,
120: second format,
180: in-vehicle communication network,
200: vehicle control system,
202: ECU,
210: first ECU,
220: second ECU,
230: third ECU,
240: fourth ECU,
250: fifth ECU,
260: sixth ECU,
400: information with MAC,
410: authentication result message,
2000: computer,
2010: host controller,
2012: CPU,
2014: RAM,
2020: input/output controller,
2022: communication interface,
2024: flash memory,
2026: ROM,
2040: input/output chip

What is claimed is:

1. A vehicle authentication control apparatus included in a first vehicle control unit mounted on a vehicle, the vehicle authentication control apparatus comprising:

an information acquisition unit configured to acquire, via an in-vehicle communication network, authenticated information, which is first format information generated by a first authentication method transmitted by a second vehicle control unit that is mounted on the vehicle and different from the first vehicle control unit;

an authentication processing unit configured to execute authentication processing on the authenticated information; and an information transmitting unit configured to transmit, via the in-vehicle communication network to a third vehicle control unit that is mounted on the vehicle and different from the first vehicle control unit and the second vehicle control unit, a result of the authentication processing executed by the authentication processing unit;

wherein the in-vehicle communication network is a network to which the first vehicle control unit, the second vehicle control unit, and the third vehicle control unit are physically connected, and through which authenticated information generated by the first authentication method and second format information generated by a method that is different from the first authentication method communicate, wherein the first authentication method is an authentication method for executing authentication processing based on an actual data portion and an authenticator portion included in the authenticated information, and
an encryption key that is set in advance, and
wherein the information transmitting unit is configured to
transmit the result of the authentication processing with
a first transmission cycle, which is a cycle for transmitting the result of the authentication processing,
being longer than a second transmission cycle of the
second vehicle control unit transmitting the authenticated information.

2. The vehicle authentication control apparatus according to claim 1, wherein:
the second vehicle control unit is capable of reading the authenticated information for which the authenticator portion is generated by the first authentication method; and
the third vehicle control unit is capable of reading the second format information generated by a method that is different from the first authentication method,
wherein the information acquisition unit is connected to the second vehicle control unit and the third vehicle control unit via the in-vehicle communication network, and
the third vehicle control unit is capable of reading the actual data portion of the authenticated information.

3. The vehicle authentication control apparatus according to claim 2, further comprising:
a retaining unit configured to retain the result of the authentication processing,
wherein in a case where the result of the authentication processing on a new piece of authenticated information acquired by the information acquisition unit is different from a result that is retained in the retaining unit, the information transmitting unit is configured to transmit the result of the authentication processing on the new piece of authenticated information.

4. The vehicle authentication control apparatus according to claim 2, wherein
the second format information includes information generated by using only data included in the second format information, and
in a case where the second format information is received via the in-vehicle communication network, the authentication processing unit is configured to execute authentication processing by using only data included in the second format information.

5. The vehicle authentication control apparatus according to claim 1, further comprising:
a retaining unit configured to retain the result of the authentication processing,
wherein in a case where the result of the authentication processing on a new piece of authenticated information acquired by the information acquisition unit is different from a result that is retained in the retaining unit, the information transmitting unit is configured to transmit the result of the authentication processing on the new piece of authenticated information.

6. The vehicle authentication control apparatus according to claim 5, wherein
the retaining unit is configured to retain the result of the authentication processing for each vehicle control unit from which the authenticated information is transmitted,
the information transmitting unit is configured to determine, for each vehicle control unit from which the authenticated information is transmitted, whether the result of the authentication processing on the new piece of authenticated information is different from a result that is retained in the retaining unit, to determine, for each vehicle control unit from which the authenticated information is transmitted, whether to transmit the result of the authentication processing on the new piece of authenticated information.

7. The vehicle authentication control apparatus according to claim 1, further comprising:
a retaining unit configured to retain the result of the authentication processing,
wherein in a case where the result of the authentication processing on a new piece of authenticated information acquired by the information acquisition unit is different from a result that is retained in the retaining unit, the information transmitting unit is configured to transmit the result of the authentication processing on the new piece of authenticated information, in addition to transmitting the result of the authentication processing in the first transmission cycle.

8. The vehicle authentication control apparatus according to claim 1, further comprising:
a control execution unit configured to execute vehicle control using information in the actual data portion based on the result of the authentication processing.

9. The vehicle authentication control apparatus according to claim 1, wherein
the second format information includes information generated by using only data included in the second format information, and
in a case where the second format information is received via the in-vehicle communication network, the authentication processing unit is configured to execute authentication processing by using only data included in the second format information.

10. A vehicle comprising the vehicle authentication control apparatus according to claim 1.

11. A vehicle control system for controlling a vehicle having an in-vehicle communication network, the vehicle control system comprising:
a first vehicle control unit that is mounted on the vehicle and configured to transmit, via the in-vehicle communication network, authenticated information that is first format information generated by a first authentication method;
a second vehicle control unit that is mounted on the vehicle and configured to receive, via the in-vehicle communication network, the authenticated information transmitted from the first vehicle control unit, and transmit, via the in-vehicle communication network, a result of authentication processing on the authenticated information; and
a third vehicle control unit that is mounted on the vehicle and configured to receive, via the in-vehicle communication network, the authenticated information transmitted from the first vehicle control unit and the result of the authentication processing transmitted from the second vehicle control unit,
wherein the third vehicle control unit is configured to control the vehicle by using data included in the authenticated information received from the first vehicle control unit, based on the result of the authentication processing by the second vehicle control unit, and
wherein the second vehicle control unit is configured to transmit the result of the authentication processing with a first transmission cycle, which is a cycle for transmitting the result of the authentication processing, being longer than a second transmission cycle of the first vehicle control unit transmitting the authenticated information.

12. The vehicle control system according to claim 11, wherein
the first authentication method is an authentication method for executing authentication processing based on an actual data portion and an authenticator portion included in the authenticated information, and an encryption key that is preset.

13. The vehicle control system according to claim 11, wherein
the in-vehicle communication network is a network having the first vehicle control unit, the second vehicle control unit, and the third vehicle control unit physically connected thereto, and through which the first format information and second format information generated by a method that is different from the first authentication method communicate.

14. The vehicle control system according to claim 13, wherein
the second format information includes information generated by using only data included in the second format information, and
the third vehicle control unit is configured to execute authentication processing by using only data included in the second format information in a case where the second format information is received via the in-vehicle communication network.

15. The vehicle control system according to claim 11, wherein
the third vehicle control unit is configured to retain the result of the authentication processing transmitted from the second vehicle control unit, and
when a new piece of authenticated information is receive from the first vehicle control unit, to execute vehicle control by using information in an actual data portion included in the new piece of authenticated information based on the retained result of the authentication processing.

16. A vehicle authentication processing method performed by a first vehicle control unit mounted on a vehicle, the vehicle authentication processing method comprising:
acquiring, via an in-vehicle communication network, authenticated information, which is first format information generated by a first authentication method transmitted by a second vehicle control unit that is mounted on the vehicle and different from the first vehicle control unit;
executing authentication processing on the authenticated information; and
transmitting, via the in-vehicle communication network to a third vehicle control unit that is mounted on the vehicle and different from the first vehicle control unit and the second vehicle control unit, a result of the authentication processing;
wherein the in-vehicle communication network is a network to which the first vehicle control unit, the second vehicle control unit, and the third vehicle control unit are physically connected, and through which authenticated information generated by the first authentication method and second format information generated by a method that is different from the first authentication method communicate,
wherein the first authentication method is an authentication method for executing authentication processing based on an actual data portion and an authenticator portion included in the authenticated information, and an encryption key that is set in advance, and
wherein the transmitting includes transmitting the result of the authentication processing with a first transmission cycle, which is a cycle for transmitting the result of the authentication processing, being longer than a second transmission cycle of transmitting the authenticated information.

* * * * *